May 30, 1961    J. D. DUDLEY    2,986,005
ENGINE STARTING SYSTEM
Filed April 24, 1959    2 Sheets-Sheet 2

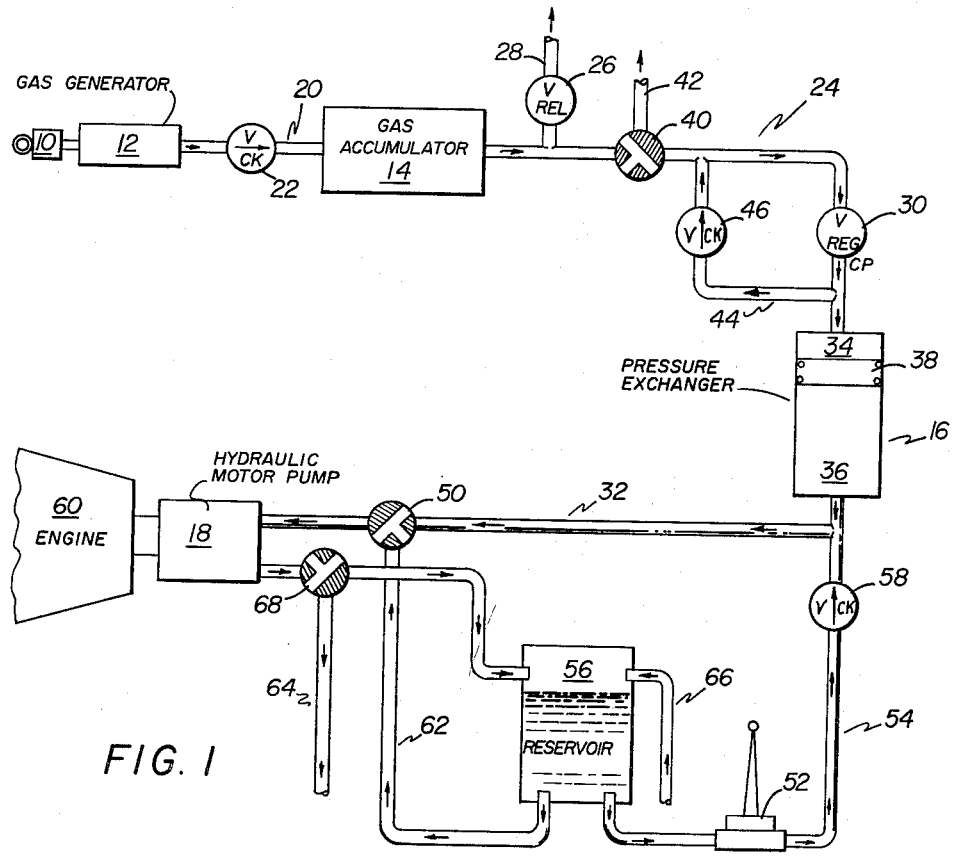
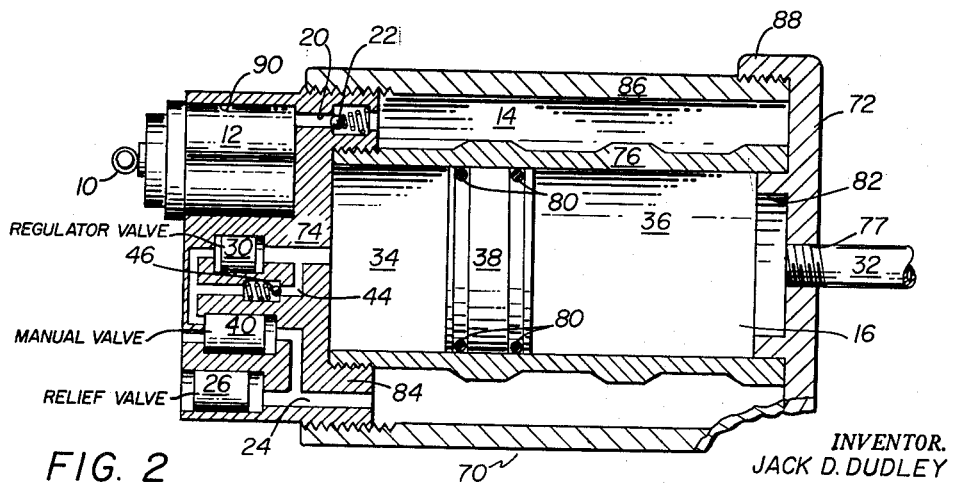

INVENTOR.
JACK D. DUDLEY
BY
*Duane C. Bowen*
ATTORNEY

United States Patent Office 2,986,005
Patented May 30, 1961

2,986,005

ENGINE STARTING SYSTEM

Jack D. Dudley, Belle Plaine, Kans., assignor to Boeing Airplane Company, Wichita, Kans., a corporation of Delaware Filed Apr. 24, 1959, Ser. No. 808,714

6 Claims. (Cl. 60—39.14)

My invention relates to an engine starting system for gas turbine engines or the like in which power is generated from explosive charges. Gas pressures from such charges are converted to hydraulic fluid pressures for starting the engines. The system has energy conservation means including an accumulator on the explosive charge gas side of the system to store energy for a time interval until use from gas supplied by one or more cartridges.

Explosive cartridges have been used for engine starting and the like by either using the gas pressures to drive a turbine or by converting the gas pressures to hydraulic fluid pressures. A difficulty with many prior systems is that the pressure, time, volume and energy characteristic of the systems are directly responsive to those of a cartridge. The time-pressure curve of the system follows those occurring in the explosion chamber and the volume of gas and the total energy is determined by that available in a single charge. When the energy is transferred directly and immediately to a hydraulic fluid system, then the maximum allowable pressure in the hydraulic system limits even the instantaneous pressures in the gas system. Hydraulic fluid being substantially incompressible, compared with a gas, no substantial energy is stored for a significant time in the hydraulic system.

It is an object of my invention to avoid these problems and, more specifically, to devise a gas pressure accumulator for the gas products of explosive charges and an associated system including valves, pressure regulators and pressure relief means whereby pressure, time, volume and energy are not directly responsive to and dependent on the characteristics of an explosive charge and are not limited by the maximum allowable pressures in the hydraulic system. It is a further object to devise a system in which a plurality of cartridges can be used to build up the pressure in such accumulator.

A considerable amount of energy is required to start an aircraft turbojet engine. It is an objective of my invention to provide an accumulator and associated pressure controls on the gas side of a cartridge-energized system that is adequate to store up energy of sufficient magnitude to start an aircraft turbojet engine or the like in a short starting cycle. Weight, an important characteristic of airborne equipment, is reduced by storing energy in an explosive charge gas accumulator due to the compressibility of the medium whereby a relatively small accumulator can be used. It is an objective of my invention to provide a low weight engine starting system both in the accumulator and in other system details so that a minimum weight penalty will be incurred in use of the starting system as a permanently mounted accessory on an aircraft. An important additional objective is to provide a self-contained starting system in which all parts are carried with the aircraft so that the starting system may be used at any location without ground-support equipment.

Further objectives of my invention include: to provide a heat exchanging relationship between the explosive charge gas accumulator and the hydraulic fluid side of the system to conserve energy and so that, for low temperature starting, the hydraulic fluid is heated before the starting action is initiated; to minimize strength requirements in the gas accumulator by providing an exhaust system for excessive instantaneous pressures; to control hydraulic fluid pressures by regulating the pressure of out-flow from the gas accumulator; and to devise a system whereby exacting requirements are not placed on the rate of burning and other characteristics of the cartridges in order to achieve economy, reliability, and logistical advantage including adaptability to the use of various cartridges that are presently available in the field.

My invention will be best understood, together with additional objectives and advantages thereof, from a reading of the following description, read with reference to the drawings, in which:

Figure 1 is a circuit diagram of a specific embodiment of my engine starting system applied to a turbojet engine;

Figure 2 is an enlarged view, principally in section, of a unitary assembly in a compact housing embodying my invention;

*Figure 1 circuit diagram*

Figure 3:
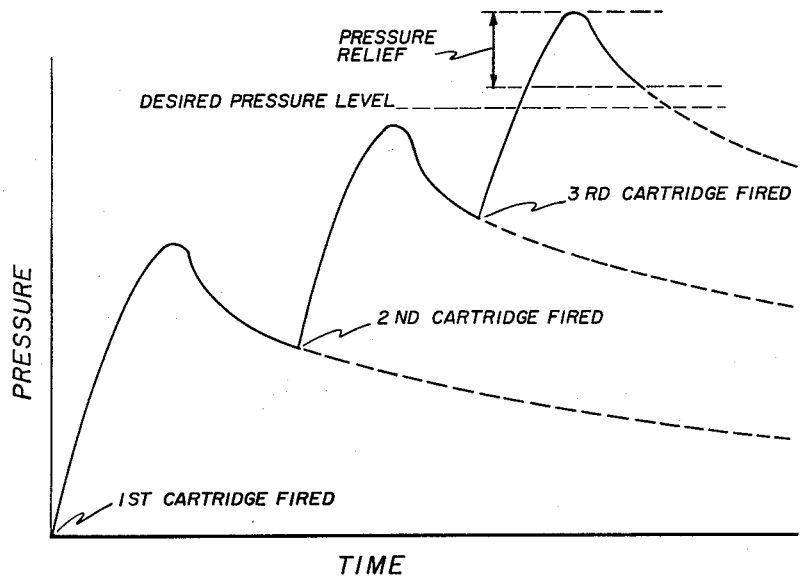
Figure 3 is a graph relating time and pressure level in the gas accumulator during build-up of pressure by successive cartridge firings.

Referring first to the circuit diagram, Figure 1, the units of the system in order include a firing mechanism 10, a cartridge-receiving gas generator 12, a gas accumulator 14, a gas-hydraulic fluid pressure exchanger 16, and a hydraulic motor/pump member 18.

Figure 4:
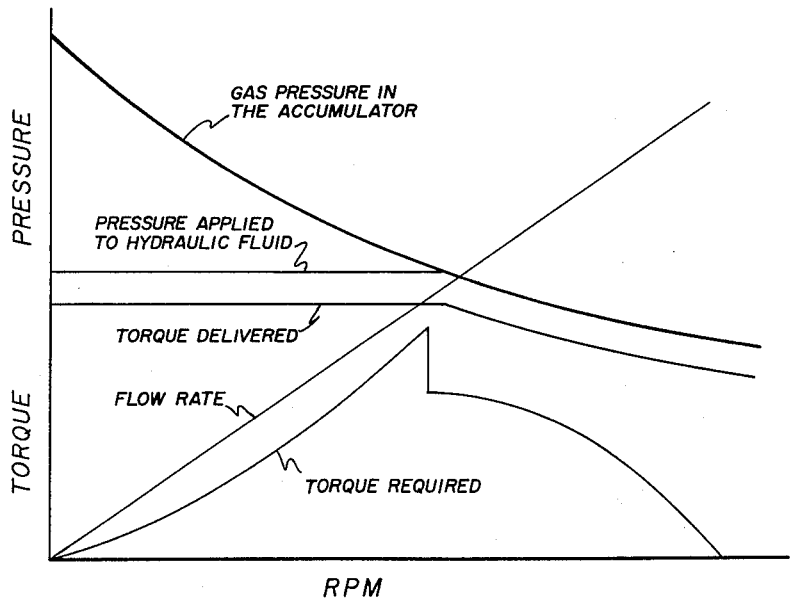
Figure 4 is a graph relating pressure in the gas accumulator and torque applied to the turbojet engine to the r.p.m. of the engine turbine during a starting cycle.

Generator 12 and accumulator 14 are connected by a line 20 and have an interposed check valve 22 in the line or on one member to prevent return of gas to generator 12. A line 24 connects accumulator 14 to pressure exchanger 16. A relief valve 26, set to exhaust pressures above a selected value, is installed in line 24 or on accumulator 14 and exhausts gas to the atmosphere through port 28 when the selected pressure is exceeded. A constant pressure outlet valve 30, set to deliver no more than a selected pressure, is interposed in line 24 and passes gas to pressure exchanger 16 only up to a selected level of pressure so that constant pressure is provided to the exchanger as long as pressures in the accumulator are higher than the selected value. The valve also passes gas when the pressure in the accumulator is lower than the selected pressure, as indicated in Figure 4. This prevents over-pressurization of the hydraulic system so that the parts can be designed to meet given pressure requirements set by pressure regulator 30.

A line 32 extends between pressure exchanger 16 and motor/pump member 18. Pressure exchanger 16 is divided into two compartments, a gas compartment 34 and a hydraulic fluid compartment 36, which are separated by a movable piston 38 whereby pressures in gas chamber 34 are duplicated in oil chamber 36.

Control of application of gas pressures to exchanger 16 preferably is provided by a three-way control valve 40 in line 24. In a first position of the valve, the "off" position, flow through line 24 is blocked. In a second position, a "bleed" position, the pressure in line 24 is exhausted to the atmosphere through port 42. In a third position, an "on" position, flow is permitted through line 24. A bypass line 44 is provided in line 24 and check valve 46 is interposed in bypass line 44. By this means, when the three-way valve 40 is in the bleed position, piston 38 is permitted to move to the gas side of exchanger 16 by relief of pressure in lines 24 and 44 through check valve 46 and out through exhaust port 42.

Although movement of three-way valve 40 could be used to control the starting cycle, the preferred means is the starting control valve 50 in line 32. This is shown as a three-way valve. At the end of the cycle of operation, piston 38 is brought back to its original position at the gas end of the chamber by pressure applied by a hand pump 52 in a line 54 from a hydraulic fluid reservoir 56 to hydraulic fluid chamber 36. A check valve 58 is interposed in line 54.

Member 18 has gears driven by hydraulic fluid from exchanger 16 during starting operation. The gears are connected to the compressor-turbine shaft of turbojet engine 60. In most installations it is convenient to combine the normal hydraulic systems fluid pumping action with the hydraulic motor starting action and preferably member 18 is a hydraulic motor/pump combination. Engine 60 drives motor/pump 18 after starting has been effected, hydraulic fluid passing from reservoir 56 through line 62 to motor/pump 18 and to the units of the hydraulic system through line 64. Fluid is returned to reservoir 56 through line 66. Three-way valves 50 and 68 are operated to change to a hydraulic fluid pumping cycle.

Operation

To review the operation, one or more cartridges are fired in gas generator 12 by the manual or electrical firing mechanism 10 thereby applying pressure to gas accumulator 14. If the instantaneous or static pressure exceeds the value set in relief valve 26 at any time, gas will be exhausted to the atmosphere through port 28 until the pressure comes down to the selected level.

After gas has been accumulated in accumulator 14 at the desired pressure, three-way valve 40 is moved from the "off" position to the "on" position thereby applying pressure through line 24 to gas chamber 34 of pressure exchanger 16. The pressure applied is limited by the pressure regulator 30. Piston 38 moves until the pressures in gas chamber 34 are reproduced in the hydraulic fluid in hydraulic fluid chamber 36.

The starting cycle is initiated by operation of valve 50 to a position connecting line 32 to motor 18. Three-way valve 68 is positioned to connect motor 18 to reservoir 56. Upon initiation of the starting cycle, hydraulic pressure from chamber 36 passes through line 32, past valve 50 and acts to move the gears in hydraulic motor/pump 18. The gears are connected by drive means with the compressor-turbine shaft of gas turbine engine 60 and the engine compressor turns over until the engine starts.

At this point, valve 68 is moved to a position connecting pump 18 with hydraulic systems supply line 64 and valve 50 is moved to a position connecting pump 18 with reservoir 56. Hydraulic motor/pump 18 is then used to provide hydraulic systems pressure out line 64 and back to reservoir 56 through hydraulic systems return line 66. It will be understood that the hydraulic systems include various aircraft systems using hydraulic pressure such as control surface and landing gear mechanisms.

During the starting cycle, piston 38 has moved toward the hydraulic fluid chamber end of exchanger 16, the distance being determined by the time that valve 50 has been opened and the pressure available in accumulator 14. To return piston 38 to its original position, first three-way control valve 40 is moved to a bleed position thereby relieving gas pressures from gas chamber 34 through bypass line 44, past check valve 46, through valve 40 and out exhaust port 42. Pressure is applied on the hydraulic fluid by hand pump 52 drawing hydraulic fluid from reservoir 56 and pumping it through line 54, past check valve 58 to hydraulic fluid chamber 36 until piston 38 assumes its original position.

Details on some of the parts will not be given as the mechanisms are well known in the art, such as three-way valves 68, 40 and 50, the hydraulic system 64, 66, 56, constant pressure regulator valve 30, relief valve 26, and the other valves. The cartridges, the firing mechanism 10 and the details of the cartridge-receiving gas generator 12 are not shown as such devices are shown in prior patents and are known in products available on the market. For example, U.S. Patents 2,652,781 and 2,293,043 show firing mechanisms, breeches, breech blocks, and mechanisms for automatically firing a plurality of cartridges, if it is desirable to use a magazine rather than to use a single cartridge assembly one or more times. Hydraulic motor/pump combinations and connecting and clutching means for connecting the motor/pump to the turbine-compressor shaft of a turbojet engine are well known and are a separate subject of development.

Figure 2 assembly

Figure 2 is a specific embodiment of the invention as it appears in an aircraft assembly. Most like parts appearing in the circuit diagram of Figure 1 are given the same reference numerals.

The principal operating parts are contained in a unitary housing 70. End castings 72 and 74 support an annular casting 76 and the three members together form pressure exchanger 16. Hydraulic fluid chamber 36 in exchanger 16 connects to line 32 through opening 77 in end casting 72. The gas chamber 34 is formed in the opposite end of annular casting 76 and piston 38 is slidably mounted in casting 76 thereby defining the inner ends of the chambers. O-ring seals 80 are shown in piston 38 but O-rings and other seals are omitted in most other parts of the assembly to avoid unnecessary details as their application will be understood by those working in the art. The ends of casting 76 are supported by an annular flange 82 on end casting 72 and by a threaded connection with an annular flange 84 on end casting 74.

A second annular body 86 is threadedly engaged with an annular flange 88 on end piece 72 and is threaded to annular flange 84 on end piece 74. Gas accumulator 14 is thus formed between members 86 and 76. This is an advantageous arrangement because the accumulator is in heat exchanging relationship with hydraulic fluid in chamber 36 which achieves the results of (1) conserving energy by containment within the system, and (2) heating hydraulic fluids for starting in low temperature environments.

A manual firing mechanism is indicated at 10 installed on a cartridge-receiving gas generator 12 housed in a recess 90 in end casting 74. Gas generator 12 is connected to accumulator 14 through a passageway 20 having a spring-pressed ball check valve 22. Gas passes from accumulator 14 through passageway 24, past three-way control valve 40 and past pressure reducer 30 into gas chamber 34. A relief valve 26 is connected with passageway 24. Bypass line 44 is a passageway between portions of line 24 and has a spring-pressed ball check valve 46.

The purpose and operation of the parts of Figure 2 will be evident from the above description of the parts and the operation of the Figure 1 circuit diagram. It will be observed that the Figure 2 unitary construction provides for heat exchange between gas accumulator 16 and oil chamber 36 and the assembly conserves weight. In some applications, however, low temperature starting is not required and, instead, heating of hydraulic fluid is a problem. In this case, heat exchange between accumulator 16 and oil chamber 36 should be prevented by insulation or by separation, following the Figure 1 construction.

Gas pressure accumulation and application

The graphs of Figures 3 and 4 show some of the advantages of the present system. Numerical quantities are not given on the displays but the graphs show the proportions of the curves and are representative of the results obtained.

The graph of Figure 3 relates pressure in accumulator 14 to time. In the specific example, it is assumed that cartridges are used having instantaneous rather than gradual burning characteristics. Three firings are shown, the first two falling short of the desired pressure level (a pressure providing ample power for starting) and short of the pressure selected in pressure relief valve 26 (the design maximum pressure which may be accepted in accumulator 14 without changer or material failure). The third cartridge results in a momentary bleed of excessive pressure down to the selected relief valve pressure. Pressures show decay with time due to temperature losses and initiation of starting will occur sometime after the selected pressure is reached. The setting of relief valve 26 should be above the desired pressure level if normally some time will elapse between cartridge firing and starting initiation, thereby allowing for pressure decay due to temperature losses.

The graph of Figure 4 relates pressure to time, as expressed by engine r.p.m. (the engine in a successful start will go from zero to a self-sustaining operating speed). The regulated pressure selected by a setting of constant pressure regulator 30 is exceeded in the accumulator during a time which is a function of the setting of the pressure regulator, the size of accumulator 14, and the setting of relief valve 26. It is thus possible to have a constant pressure in the hydraulic fluid throughout the starting cycle or to have the decrease in pressure shown in the graph during the later part of the cycle. The pressure curve will be varied in contour by temperature losses and by increases in pump flow rate as r.p.m. builds up. As shown, the accumulator and the applied pressures are the same after the pressure goes below that set on regulator valve 30. The engine torque required, shown by the graph, is typical of a class of engines.

The torque required (torque required to be supplied by starting system hydraulic pressure until the engine is self-sustaining) is a function of acceleration and loads in excess of the torque generated by combustion during starting. A break in the curve, as shown, occurs when combustion is achieved. The torque delivered by the present starting system has a proportionate relationship to the oil pressures. This is why the torque delivered and the pressure applied curves are parallel in Figure 4. A hydraulic fluid flow rate of motor 18 is shown which follows those of constant displacement motors, assuming that horsepower is not governed to a constant value. Thus the torque delivered follows the curve of the regulated pressure to the oil accumulator and the decay in torque delivered is a result of the pressure decay and is not a function of motor displacement.

As indicated by the graphs, the present starting system can be adapted to the requirements of various engines. The system is integrated with the auxiliary hydraulic system. The weight is a minimum consistent with a unit which is self-contained, which is carried with the aircraft and which requires no ground support equipment. The system is adaptable to various cartridges. One or more cartridges may be fired and economical charges may be used in which the burning characteristics are not difficult to obtain. This is to be contrasted with systems in which the hydraulic pressures are directly responsive to cartridge pressures and cartridges must meet rigorous standards particularly in gradual burning characteristics. The accumulator 14 for the gas products of the explosive charges may be designed to be of ample volume and pressure to start a turbojet engine. For multi-engine aircraft, more than one starter can be provided or a single starter may be connected to more than one engine by suitable lines and valves. However, aircraft engine systems are often designed so that the first engine to be started is used to provide power for other engine startings.

Having thus specifically described my invention, I do not wish to be understood as limiting myself to the precise details of construction shown, but instead wish to cover those modifications thereof which will occur to those skilled in the art from my disclosure and which fall within the scope of my invention, as described in the following claims.

I claim:

1. Means for supplying pressurized hydraulic fluids comprising: a gas generator having means operative to fire explosive cartridges therein; a gas storage accumulator for the cartridge gas products having capacity and adapted to contain gas from more than one cartridge, a first line connecting said accumulator to said generator and a check valve preventing return of gas to said generator; exhaust means from said accumulator, including a relief valve, exhausting gas in excess of a selected pressure from said accumulator to outside of said accumulator; a pressure exchanger having a chamber for gas and a chamber filled with hydraulic fluid and having a movable piston separating said chambers for equalization of pressure therebetween, a second line connecting said accumulator to said gas chamber including a pressure regulator preventing pressures higher than a selected pressure from being applied to said gas chamber and said second line having an operator operated control valve operable to block application of pressure to said gas chamber until turned to an "on" position; and a third line from said hydraulic fluid chamber, whereby said hydraulic fluid may be supplied to an operating mechanism for utilizing the pressurized hydraulic fluid.

2. The subject matter of claim 1 in which there is a bypass line from said gas chamber around said pressure regulator and connecting to said control valve and said control valve having a "bleed" position exhausting gas from said bypass line to the atmosphere upon operation by the operator whereby pressure may be relieved in said gas chamber at the end of a cycle.

3. A starting system for a jet engine, comprising: a gas generator having means operative to fire explosive cartridges therein; a gas storage accumulator for cartridge gas products having capacity and adapted to contain gas from more than one cartridge and fluid flow connecting means from said generator to said accumulator; exhaust means from said accumulator exhausting gas in excess of a selected pressure; a pressure exchanger having a chamber for said cartridge gas products and a chamber for hydraulic fluid and having movable wall means separating said chambers for equalization of pressure therebetween, fluid flow connecting means from said accumulator to said gas chamber including a pressure regulator preventing pressures higher than a selected pressure from being applied to said gas chamber; a hydraulic motor connected to said jet engine to power the same during starting and fluid flow connecting means from said hydraulic fluid chamber to said motor and a starting control valve controlling the application of hydraulic fluid pressure to said motor; a hydraulic fluid reservoir connected to said hydraulic fluid chamber for resupply of hydraulic fluid thereto and a hand pump interposed between said reservoir and said hydraulic fluid chamber to move fluid therebetween; and fluid connection means between said motor and said reservoir whereby hydraulic fluid supplied from said hydraulic fluid chamber to said motor then passes to said reservoir.

4. A starting system for a jet engine, comprising: a gas generator having means operative to fire explosive cartridges therein, a gas storage accumulator for cartridge gas products having capacity and adapted to contain gas from more than one cartridge and fluid flow connecting means from said generator to said accumulator; a pressure exchanger having a chamber for said cartridge gas products and a chamber for hydraulic fluid and having movable wall means separating said chambers for equalization of pressure therebetween, fluid flow connecting means from said accumulator to said gas chamber including a pressure regulator preventing pressures higher than a selected pressure from being applied to said gas chamber; hydraulically powered means connected to said jet engine to power the same during starting and fluid flow connecting means from said hydraulic fluid chamber to said hydraulically powered means; a hydraulic fluid reservoir connected to said hydraulic fluid chamber and means operable to resupply hydraulic fluid from said reservoir to said hydraulic fluid chamber at the end of a starting cycle; and fluid connection means between said hydraulically powered means and said reservoir whereby hydraulic fluid supplied from said hydraulic fluid chamber to said hydraulically powered means then passes to said reservoir.

5. The subject matter of claim 4 in which said hydraulically powered means, is a hydraulic pump-motor unit and is operative to act as a hydraulic pump powered by said jet engine after the engine is started, a hydraulic systems circuit including said reservoir, and control means having a first position for starting said engine permitting hydraulic fluid flow from said hydraulic fluid chamber to said unit and then to said reservoir and having a second position during normal engine operation disconnecting said unit from said hydraulic fluid chamber and connecting said unit to said hydraulic systems circuit.

6. Means for supplying pressurized hydraulic fluids, comprising: a gas generator having means operative to fire explosive cartridges therein; a gas storage accumulator for the cartridge gas products having capacity and adapted to contain gas from more than one cartridge and fluid flow connecting means from said generator to said accumulator; exhaust means from said accumulator, including a relief valve, exhausting gas in excess of a selected pressure from said accumulator; a pressure exchanger having a chamber for said cartridge gas products and a chamber for hydraulic fluid and having a movable piston separating said chambers for equalization of pressure therebetween, fluid flow connecting means from said accumulator to said gas chamber including a pressure regulator preventing pressures higher than a selected pressure from being applied to said gas chamber; said accumulator being annular and encircling said hydraulic fluid chamber of said pressure exchanger in heat exchanging relationship therewith to heat the hydraulic fluid for low temperature operation or conservation of energy; and fluid flow connecting means from said hydraulic fluid chamber, whereby pressurized hydraulic fluid may be supplied to an operating mechanism.

References Cited in the file of this patent

UNITED STATES PATENTS

| | | |
|---|---|---|
| 1,358,947 | Fulton | Nov. 16, 1920 |
| 1,935,123 | Lansing | Nov. 14, 1933 |
| 2,171,257 | Nardone | Aug. 29, 1939 |
| 2,313,056 | Emerson | Mar. 9, 1943 |
| 2,399,680 | Keefer | May 7, 1946 |
| 2,652,781 | Deardorff et al. | Sept. 22, 1953 |

FOREIGN PATENTS

| | | |
|---|---|---|
| 123,045 | Australia | Dec. 9, 1946 |
| 545,048 | Great Britain | May 8, 1942 |